United States Patent
Robinson (10) Patent No.: US 10,019,805 B1
(45) Date of Patent: Jul. 10, 2018

(54) DETECTING VEHICLE MOVEMENT THROUGH WHEEL MOVEMENT

(71) Applicant: Waymo LLC, Mountain View, CA (US)

(72) Inventor: Craig Lewin Robinson, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 310 days.

(21) Appl. No.: 14/869,015

(22) Filed: Sep. 29, 2015

(51) Int. Cl.
| | | |
|---|---|---|
| *G06K 9/00* | (2006.01) | |
| *G06T 7/20* | (2017.01) | |
| *G06T 7/00* | (2017.01) | |
| *G07C 5/06* | (2006.01) | |
| *G08G 1/01* | (2006.01) | |

(Continued)

(52) U.S. Cl.
CPC ............. *G06T 7/20* (2013.01); *G05D 1/0253* (2013.01); *G06K 9/00791* (2013.01); *G06K 9/00805* (2013.01); *G06K 9/00825* (2013.01); *G06T 7/0042* (2013.01); *G06T 7/246* (2017.01); *G07C 5/06* (2013.01); *G08G 1/01* (2013.01); *G08G 1/0112* (2013.01); *G08G 1/04* (2013.01);

(Continued)

(58) Field of Classification Search
CPC ........... G06K 9/00791; G06K 9/00798; G06K 9/00805; G06K 9/00825; G08G 1/01; G08G 1/0112; G08G 1/0125; G08G 1/0133; G08G 1/0137; G08G 1/0145; G08G 1/04; G08G 1/052; G08G 1/166; G05D 1/0246; G05D 1/0253; G05D 1/0272; G05D 1/0287; B60K 2031/0025; B60K 2031/0033; B60K 2031/0041; G06T 7/20; G06T 7/223; G06T 7/246; G06T 7/248; G06T 7/269
USPC ............... 382/100, 103, 104, 107, 287, 291; 356/27–29, 138, 139.09, 614, 615, 620, 356/622, 955, 958; 348/148, 149, 154, 348/155, 169; 340/435, 436, 438, 441, 340/463–467, 901, 903, 936–938; 701/19, 20, 70, 71, 74, 93, 96, 119, 300, 701/301; 702/142, 145–149, 151; 180/197
See application file for complete search history.

(56) References Cited

U.S. PATENT DOCUMENTS

| | | | | |
|---|---|---|---|---|
| 5,473,364 | A * | 12/1995 | Burt ....................... | G06T 7/254 |
| | | | | 348/144 |
| 7,446,798 | B2 * | 11/2008 | Comaniciu .......... | G06K 9/3241 |
| | | | | 348/143 |

(Continued)

*Primary Examiner* — Eric Rush
(74) *Attorney, Agent, or Firm* — Lerner, David, Littenberg, Krumholz & Mentlik, LLP (57) ABSTRACT

Aspects of the disclosure relate to detecting vehicle movement. For example, one or more computing devices may receive first image data representative of a vehicle's wheel and second image data representative of the wheel captured subsequent to the capture of the first image data. The one or more computing devices may determine a first location of a first portion of the wheel based on the first image data, and a second location of the first portion of the wheel based on the second image data. The one or more computing devices may calculate a value based on the angular distance between the first location and the second location of the first portion, and based on the value, determine whether the vehicle is in motion. Upon determining the vehicle is in motion the one or more computing devices may provide a signal that the vehicle is in motion.

20 Claims, 8 Drawing Sheets

(51) Int. Cl.
*G08G 1/04* (2006.01)
*G06T 7/246* (2017.01)
*G05D 1/02* (2006.01)
*G08G 1/16* (2006.01)
*B60K 31/00* (2006.01)

(52) U.S. Cl.
CPC ...... *G08G 1/166* (2013.01); *B60K 2031/0025* (2013.01); *G06T 2207/30252* (2013.01)

(56) References Cited

U.S. PATENT DOCUMENTS

| | | | |
|---|---|---|---|
| 7,788,033 B2* | 8/2010 | Isaji | G08G 1/166 |
| | | | 382/103 |
| 8,040,227 B2* | 10/2011 | Friedrichs | G06K 9/00805 |
| | | | 382/104 |
| 8,542,881 B2 | 9/2013 | Teti et al. | |
| 8,780,189 B2 | 7/2014 | Kilian | |
| 8,791,802 B2* | 7/2014 | Schwindt | G01S 13/867 |
| | | | 340/425.5 |
| 8,933,797 B2 | 1/2015 | Deigmoller et al. | |
| 9,052,329 B2 | 6/2015 | Fan et al. | |
| 2006/0171562 A1* | 8/2006 | Yoshida | G06K 9/00805 |
| | | | 382/104 |
| 2007/0124030 A1 | 5/2007 | Mori et al. | |
| 2008/0192113 A1* | 8/2008 | Kilian | B60T 17/228 |
| | | | 348/61 |
| 2012/0140072 A1* | 6/2012 | Murashita | G06K 9/00805 |
| | | | 382/103 |
| 2015/0071490 A1* | 3/2015 | Fukata | G06K 9/00791 |
| | | | 382/103 |
| 2015/0298621 A1* | 10/2015 | Katoh | G06K 9/00805 |
| | | | 348/148 |
| 2015/0302260 A1* | 10/2015 | Kijima | G06K 9/00805 |
| | | | 382/103 |
| 2015/0302586 A1* | 10/2015 | Fukata | G06K 9/00791 |
| | | | 382/103 |
| 2016/0086040 A1* | 3/2016 | Kuehnle | G06K 9/00805 |
| | | | 382/103 |

\* cited by examiner

DETECTING VEHICLE MOVEMENT THROUGH WHEEL MOVEMENT

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location.

An important component of an autonomous vehicle is the perception system, which allows the vehicle to perceive and interpret its surroundings using cameras, radar, sensors, and other similar devices. Data from the perception system is then used by the autonomous vehicle's computer to make numerous decisions while the autonomous vehicle is in motion, such as decided when to speed up, slow down, stop, turn, etc. These decisions are used to maneuver between locations but also to interact with and avoid collisions with other objects along the way.

SUMMARY

Embodiments within the disclosure relate generally to a detecting vehicle motion through wheel movement. One aspect includes a method for detecting vehicle movement. First image data representative of a vehicle's wheel may be received by one or more computing devices. The one or more computing devices may determine a first location of a first portion of the wheel, based on the first image data. Second image data representative of the vehicle's wheel captured subsequent to the capture of the first image data may be received by one or more computing devices. Based on the second image data a second location of the first portion of the wheel may be determined by the one or more computing devices. Based on an angular distance between the first location and the second location of the first portion, the one or more computing devices may calculate a value and determine, based on the value, whether the vehicle is in motion. A signal may be provided indicating that the vehicle is in motion.

Another embodiment includes a system comprising one or more sensors, one or more computing devices, and memory storing instructions, wherein the instructions are executable by the one or more computing devices. The instructions comprise determining, based on first image data representative of a vehicle's wheel received from the one or more sensors, a first location of a first portion of the wheel and determining, based on second image data representative of the wheel captured subsequent to the capture of the first image data received from the one or more sensors, a second location of the first portion of the wheel. Based on the angular distance between the first location and the second location of the first portion, calculating a value and determining whether the vehicle is in motion based on the value. A signal may be provided indicating that the vehicle is in motion.

Another aspect includes a non-transitory computer-readable storage medium on which computer-readable instructions of a program are stored. The instructions, when executed by a processor, may cause the processor to perform a method. The method may include receiving, from one or more computing devices, first image data representative of a vehicle's wheel. Based on the first image data a first location of a first portion of the wheel may be determined. Second image data representative of the wheel captured subsequent to the capture of the first image data may be received from the one or more computing devices. A second location of the first portion of the wheel may be determined based on the second image data. A value based on the angular distance between the first location and the second location of the first portion may be calculated, and a determination whether the vehicle is in motion may be made based on the value. A signal that the vehicle is in motion may be provided.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Overview

The technology relates to, by way of example, detecting vehicle motion by analyzing the movement of one or more wheels of a vehicle over a period of time. As an example, the position (or relative orientation) of the same vehicle wheel captured in two different images at two different times may change. This change may be used to determine that the wheel is in motion and that the vehicle to which the wheel is attached is also in motion.

For instance, one or more sensors may be mounted on a first vehicle to monitor the surrounding environment. These sensors may include one or more cameras that continually capture a series of images such as video frames or other images of the vehicle's surroundings. Other possible sensors providing images may include radar, sonar, and LIDAR, each of which may provide images representative of the shape, location, and orientation of an object.

A computing device may analyze the series of images to identify vehicles in the surrounding environment ("surrounding vehicles"). For example, the computing device may sequentially analyze video frames captured by a camera to determine whether the video contains image data representative of a vehicle.

The computing device may also analyze the image data to identify the wheels of the surrounding vehicles. In some embodiments, the computing device may analyze the image data using an object detection algorithm.

For each detected wheel, the device may determine whether the image data of the wheel includes a tracking feature. For example, the image data corresponding to each wheel may be analyzed to determine the presence of one or more image features and/or feature descriptors, such as gradient-based key points in each frame of the video captured by the camera. Image features and/or feature descriptors may include any feature of a wheel that rotates, such as a hub cab, spoke, bolt, or writing on the tire wall.

If the image data includes a tracking feature, the computing device may track the location of each tracking feature over time. For example the locations of the tracking features may be measured relative to another portion of the wheel, such as the wheel's center. The device may determine that the vehicle is in motion based on the angular distance that a tracking feature moved relative to the reference point from one image to the next. When the angular distance surpasses a threshold, the computing device may determine that the vehicle associated with the tracking feature is in motion.

The computing device, upon determining that a surrounding vehicle is in motion, may generate a signal. For instance, the signal may be a notification that causes the first vehicle to automatically perform a driving function, such as steering away from the surrounding vehicle, braking, and/or accelerating. In some embodiments a visual or audio notification may be provided within the cabin of the first vehicle notifying the passengers and driver of the first vehicle that a surrounding vehicle is in motion.

The features described herein may allow for the automatic detection of a slow moving vehicle in the vicinity of the first vehicle. This may allow the first vehicle to move more safely through complex driving environments, such as residential neighborhoods. In addition, the system may provide performance advantages over other techniques that are more susceptible to signal noise. The system may also provide performance advantages over other techniques which have difficulty determining if slow moving objects are in motion.

Example Systems

Figure 1:
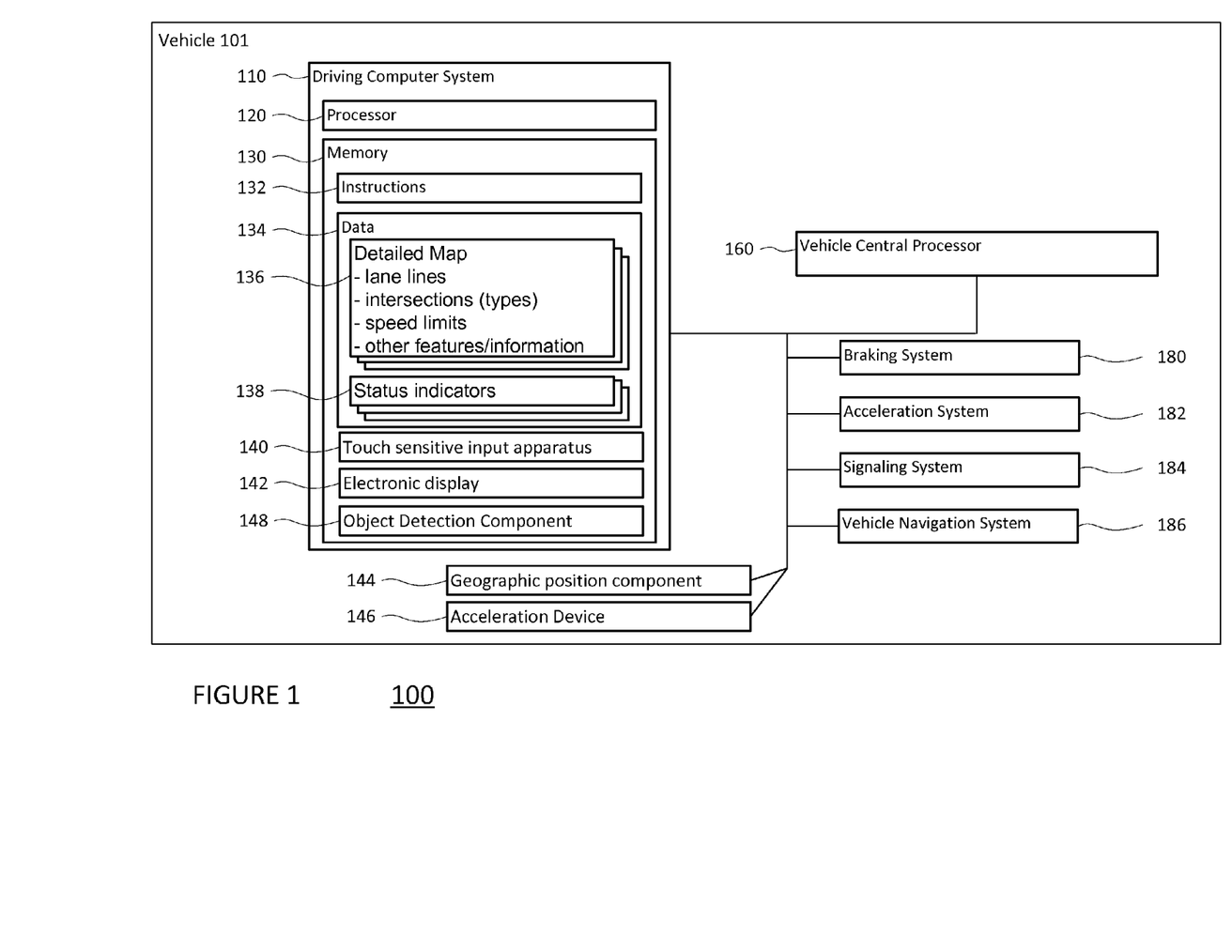
FIG. 1 is a functional diagram of a system in accordance with an exemplary embodiment.

As shown in FIG. 1, an autonomous driving system 100 in accordance with one aspect of the disclosure includes a vehicle 101 with various components. While certain aspects of the disclosure are particularly useful in connection with specific types of vehicles, the vehicle 101 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein, some of the components, such as steering components, acceleration and deceleration components, may each have their own processor that only performs calculations related to the component's specific function.

In various aspects described herein, the processor may be located remotely from the vehicle and communicate with the vehicle wirelessly. In other aspects, some of the processes described herein are executed on a processor disposed within the vehicle and others by a remote processor, including taking the steps necessary to execute a single maneuver.

Computer 110 may all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input 140 (e.g., a mouse, keyboard, touch screen and/or microphone), as well as various sensors (e.g., a video camera) for gathering explicit (e.g., a gesture) or implicit (e.g., "the person is asleep") information about the states and desires of a person.

In one example, computer 110 may be an autonomous driving computing system incorporated into vehicle 101. The autonomous vehicle may include all of the features of a non-autonomous vehicle, for example: a steering apparatus, such as steering wheel; a navigation display apparatus; and a gear selector apparatus, such as gear shifter. The vehicle may also have various user input devices, such as gear shifter, touch screen, button inputs, or touch sensitive input apparatus 140 for activating or deactivating one or more autonomous driving modes and for enabling a driver or drivers to provide information, such as a navigation destination, to the autonomous driving computer 110.

Vehicle 101 may include one or more additional displays. For example, the vehicle may include a display for displaying information regarding the status of the autonomous vehicle or its computer. In another example, the vehicle may include a status indicating apparatus 138 (see FIG. 1), such as a status bar, to indicate the current status of vehicle 101. In this regard, the vehicle may display text on an electronic display, illuminate portions of vehicle 101, such, or provide various other types of indications.

The autonomous driving computing system may capable of communicating with various components of the vehicle. For example, as shown in FIG. 1, computer 110 may be in communication with the vehicle's central processor 160 and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other devices in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include one or more object detection components 148 for detecting objects external to the vehicle such as other vehicles, obstacles in the roadway, traffic signals, signs, trees, etc. The detection system may include lasers (LIDAR), sonar, radar, cameras or any other detection devices which record data which may be processed by computer 110. For example, if the vehicle is a small passenger vehicle, the car may include a laser mounted on the roof or other convenient location.

Figure 2:
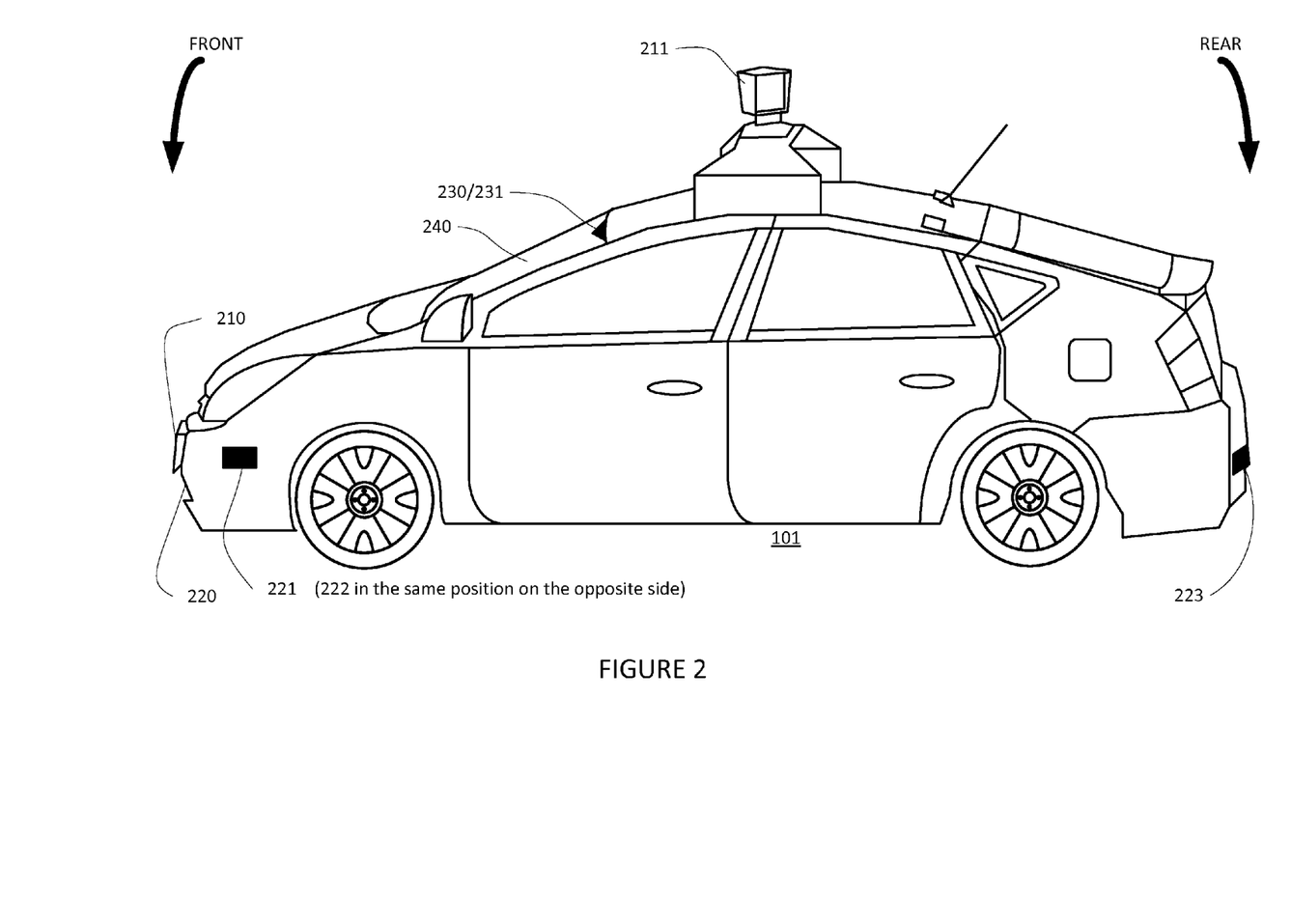
FIG. 2 is an exterior of an autonomous vehicle in accordance with an exemplary embodiment.

As shown in FIG. 2, vehicle 101 may include lasers 210 and 211, mounted on the front and top of the vehicle, respectively. Laser 210 may have a range of 150 meters, a thirty degree vertical field of view, and a thirty degree horizontal field of view. Laser 211 may have a range of 50-80 meters, a thirty degree vertical field of view, and a 360 degree horizontal field of view. The lasers may provide the vehicle with range and intensity information which the computer may use to identify the location and distance of various objects. In one aspect, the lasers may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. As shown in the example of FIG. 2, vehicle 101 includes radar detection units 220-223 located on the side (only one side being shown), front and rear of the vehicle. Each of these radar detection units may have a range of 200 meters for an 18 degree field of view as well as a range of 60 meters for a 56 degree field of view.

In another example, a variety of cameras may be mounted on the vehicle. The cameras may be mounted at predetermined distances so that the parallax from the images of 2 or more cameras may be used to compute the distance to various objects. As shown in FIG. 2, vehicle 101 may include 2 cameras 230-231 mounted under a windshield 240 near the rear view mirror (not shown). Camera 230 may include a range of 200 meters and a 30 degree horizontal field of view, while camera 231 may include a range of 100 meters and a 60 degree horizontal field of view.

The aforementioned sensors may allow the vehicle to evaluate and potentially respond to its environment in order to maximize safety for the driver, other drivers, as well as objects or people in the environment. It will be understood that the vehicle types, number and type of sensors, the sensor locations, the sensor fields of view, and the sensors' sensor fields are merely exemplary. Various other configurations may also be utilized.

In addition to the sensors described above, the computer may also use input from sensors typical non-autonomous vehicles. For example, these sensors may include tire pressure sensors, engine temperature sensors, brake heat sensors, break pad status sensors, tire tread sensors, fuel sensors, oil level and quality sensors, air quality sensors (for detecting temperature, humidity, or particulates in the air), etc.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, or other such objects and information. For example, the map information may include explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

Example Methods

Figure 3:
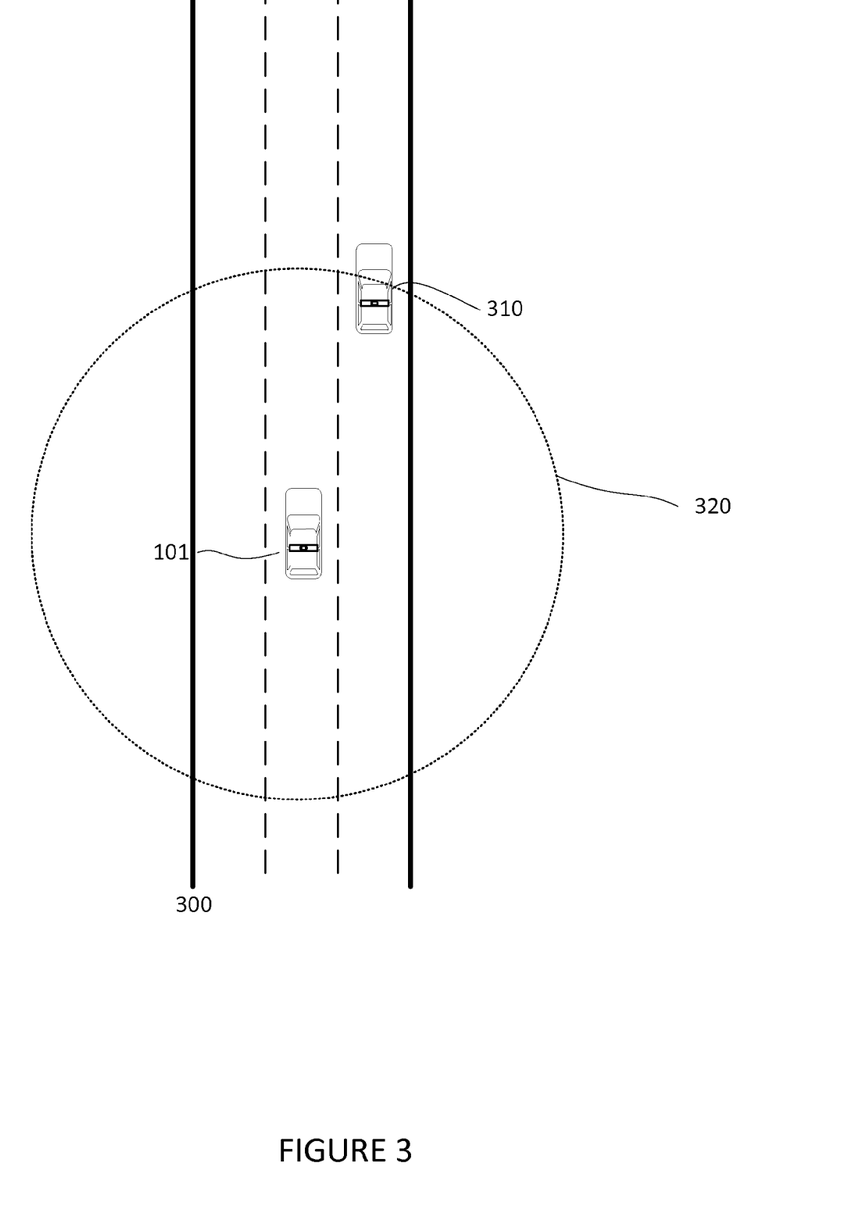
FIG. 3 is a diagram of a vehicle and example data in accordance with aspects of the disclosure.

One or more sensors may be mounted on a first vehicle to monitor the surrounding environment, such as a camera that continually captures a video or other series of images of the vehicle's surroundings. As shown in FIG. 3, a first vehicle, such as vehicle 101 may have one or more sensors, such as cameras 230-231, mounted thereon. The cameras may continually capture a series of images such as video frames or other images of the first vehicle's surrounding environment 320 as the first vehicle drives down road 300. Each video frame, of the series of images, may be captured every sixtieth of a second, or more or less. Other possible sensors providing images and/or video frames may include radar, sonar, and LIDAR, each of which may provide images representative of the shape, location, and orientation of an object.

Figure 4A:
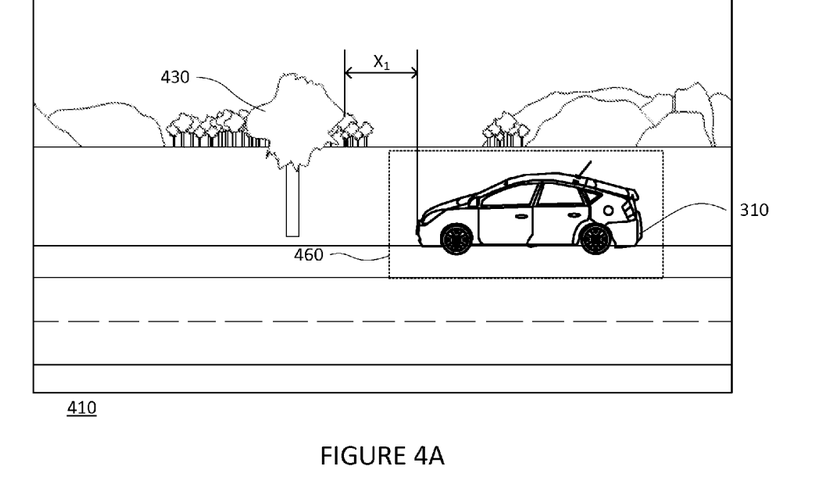
FIGS. 4A and 4B are images in accordance with aspects of the disclosure.

A computing device may analyze the series of images to identify vehicles in the surrounding environment ("surrounding vehicles"). In this regard, the computing device, such as computing device 160, may use an object detection algorithm to determine whether the series of images include image data representative of a surrounding vehicle. For example, as shown in FIG. 4A, a first video frame 410 of the series of images may be analyzed, and first image data 460 of surrounding vehicle 310 may be determined.

Figure 4B:
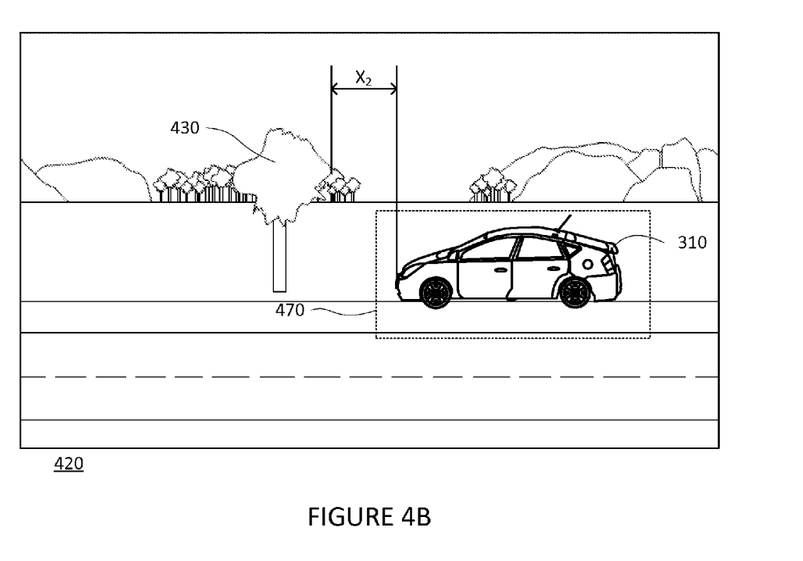

As further illustrated in FIG. 4B, a second video frame 420 of the series of images, captured subsequently of the first video frame 410, may then be analyzed. The computing device 160 may determine that the second video frame 420, captured some time, such as a sixtieth of a second, after the first video frame 410, includes second image data 470 of the surrounding vehicle 310.

Surrounding vehicles may include motor vehicles within a predetermined geographical position and motion, relative to the first vehicle. In this regard, surrounding vehicles may include vehicles moving in a specific direction relative to the first vehicle, vehicles located within a set distance of the first vehicle, vehicles located at specific coordinates relative to the first vehicle, and/or vehicles moving at, below, or above, a specific speed. In some embodiments, surrounding vehicles may only include vehicles which are on the same street, and in front of the first vehicle. For example, referring back to FIG. 3, surrounding vehicle 310 may be positioned in front of first vehicle 101, and within the first vehicle's surrounding environment 320. In another example, surrounding vehicles may include only vehicles which are moving slower than five miles per hour and within two hundred feet of the first vehicle.

The position of the surrounding vehicle may be measured in a global space. In this regard, the computing device may analyze the captured video frames to identify the position of the surrounding vehicle relative to external objects. For example, as further illustrated in FIGS. 4A and 4B, the location of the surrounding vehicle 310 may be measured relative to object 430. Turning first to FIG. 4A, the location of the surrounding vehicle 310 may be determined to be a linear distance of $X_1$ from object 430 at the time the first video frame 410 was captured. In FIG. 4B, the location of the surrounding vehicle 310 may be determined to be a linear distance of $X_2$ from object 430 at the time the second video frame 420 was captured.

A preliminary determination regarding the motion of the surrounding vehicle may be made when the difference between linear distances over a period of time is larger than a threshold value. In this regard, the computing device 160 may determine, for each captured video frame, the difference between the linear distances over a period of time. For example, the computing device 160 may determine a difference value between linear difference $X_1$ and linear distance $X_2$ is six inches. The difference value may then be compared to a threshold hold value, such as five inches, or more or less, over a period of one half second, or more or less. As the difference value, captured one sixtieth of a second apart, is greater than the threshold value, the computing device may provide an initial determination that the surrounding vehicle is in motion.

In some embodiments, the location of the surrounding vehicle 310 may be determined based on the current location of the first vehicle. For example, the surrounding vehicle 310 may be placed in space, including a latitude, longitude, and/or altitude in relation to the first vehicle's location, at the time the first video frame 410 was captured. The location of the surrounding vehicle 310 may then be placed in space, including a latitude, longitude, and/or altitude in relation to the first vehicle's location, at the time the second video frame 420 was captured. A difference value between the location of the surrounding vehicle 310 in the first video frame and the second video frame may then be determined. The difference value, as well as the time between the capturing of the video frames may then be used to determine the vehicle's velocity and position. As such, an initial determination that the surrounding vehicle is in motion may be made, as described above.

In some embodiments a confidence score may be assigned to the difference value. Referring back to FIGS. 4A and 4B, the difference value between distances $X_1$ and $X_2$ is small. Further, known techniques to measure a vehicles movement in relation to other objects may be inconclusive due to measurement errors. For example, object 430 may also be swaying in a breeze during the capture of the first and second video frames. Other measurement errors may result from errors in tracking external objects, signal noise, obstructions between the external object and the first and/or surrounding vehicles, etc. As such, the determined linear distances $X_1$ and $X_2$ may be measured from different points. Thus, a low confidence score may be assigned to the difference value. Confidence scores may be of any range, such as 0.0-1, 0-10, 1-100, etc., and may be assigned to the difference value.

When the assigned confidence score fails to satisfy a certain threshold value, the initial determination that the surrounding vehicle is or is not in motion may not be relied upon. In this regard, subsequent motion determinations, such as those described herein, may be performed. The subsequent motion determinations may also be performed when the confidence score is below, above, and/or at the threshold value.

Figure 5:
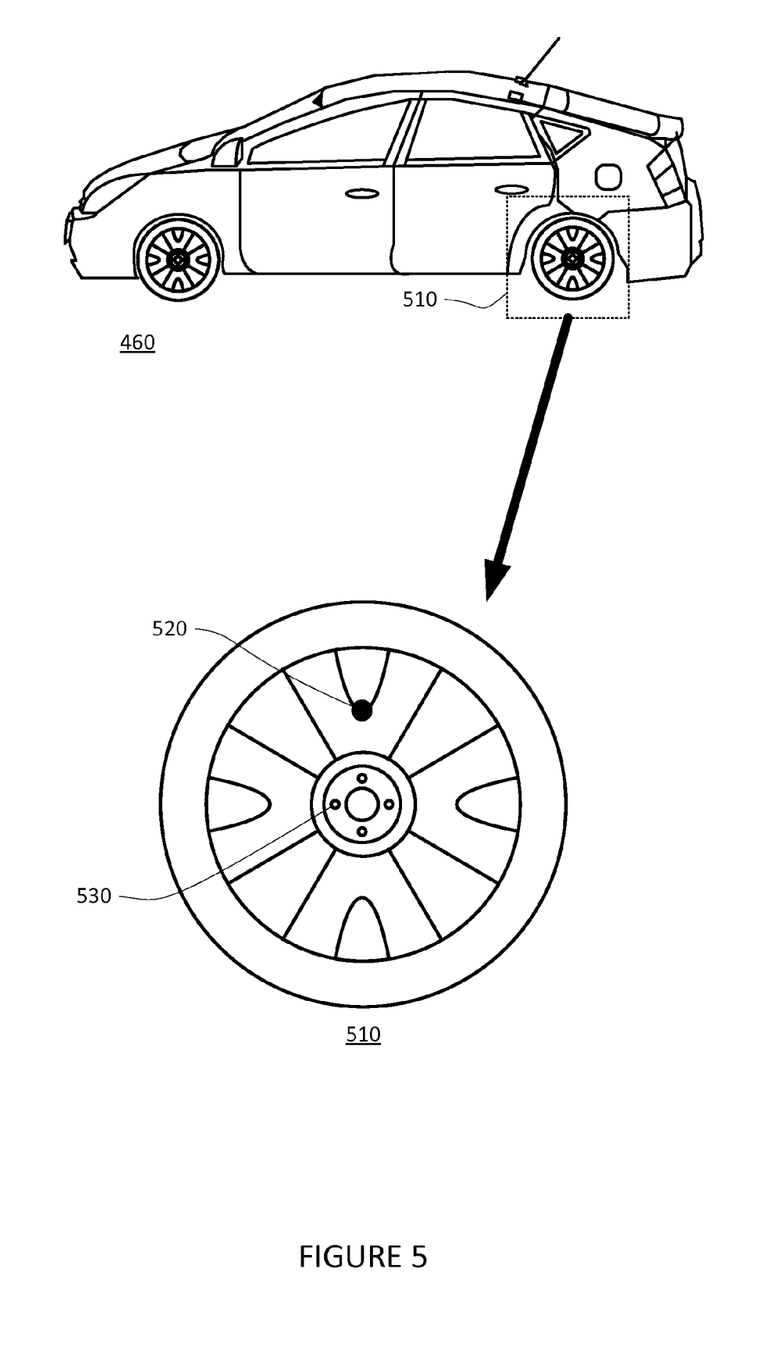
FIG. 5 is an example a vehicle and the vehicle's wheel, in accordance with aspects of the disclosure.

The computing device may analyze the video frames to identify image data of the wheels of the surrounding vehicles. For example, as shown in FIG. 5, the computing device may use any object detection algorithm capable of identifying vehicle wheels to identify wheel 510 from the first image data 460 of surrounding vehicle 310. Similarly, in FIG. 6, second image data 470 may be analyzed by the computing device and wheel 610 may be identified.

Figure 6:
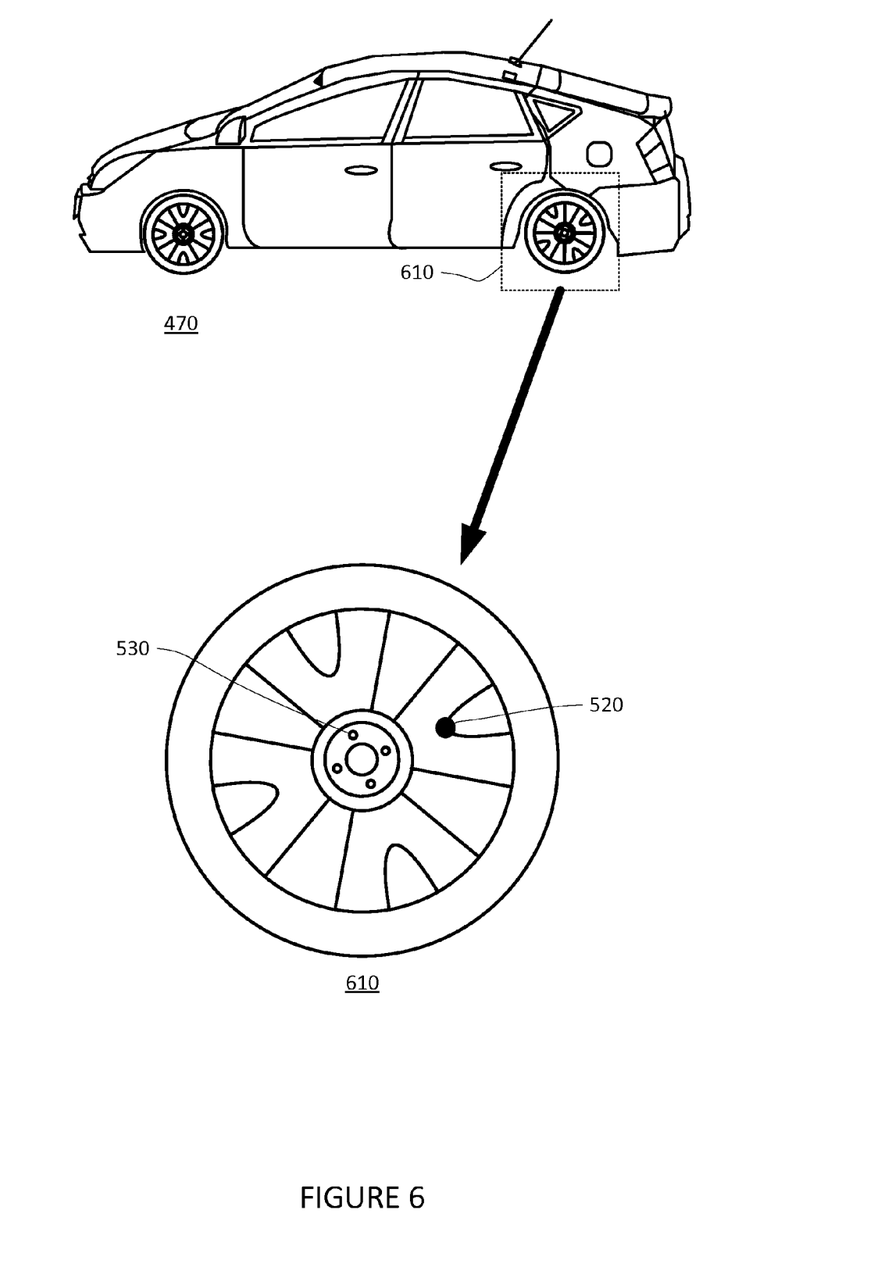
FIG. 6 is another example of a vehicle and the vehicle's wheel, in accordance with aspects of the disclosure.

For each detected wheel, the device may determine whether the image data of the wheel includes a tracking feature. In this regard, tracking features may be determined using feature detection algorithms such as scale-invariant feature transform "SIFT", speeded up robust features "SURF", gradient location and orientation histogram "GLOH", histogram of oriented gradients "HOG", and/or other such feature detection algorithms. For example the image data corresponding to each wheel may be analyzed to determine the presence of one or more image features and/or feature descriptors, such as gradient-based key points, in each frame of the video captured by the camera. Image features and/or feature descriptors may include any feature of a wheel that rotates, such as a hub cab, spoke, bolt, or writing on the tire wall. For example, as shown in FIG. 5 the image data corresponding to wheel 510 may be analyzed to determine tracking features 520, a portion of the wheel's spoke, and a bolt 530, securing the wheel to the vehicle. As shown in FIG. 6 the image data corresponding to wheel 610 may be analyzed to determine tracking features 520 and 530. In some embodiments, the image data of the vehicle may be used instead of, or in addition to image data corresponding to the wheel.

In one example, optical flow techniques which track motion of objects between captured video frames may be used to determine and track features. For example, algorithms which detect salient features within a captured video frame and map the displacement of the salient features between captured video frames by matching intensity values of the salient features between captured video frames, as found in the Kanade-Lucas-Tomasi (KLT) feature tracking technique, the Horn-Schunck method, the Buxton-Buxton method, the Black-Jepson method, etc., may be used to determine and map the tracking features. In some embodiments, if a preset number of tracking features are lost between captured video frames, new tracking features may be found.

Figure 7:
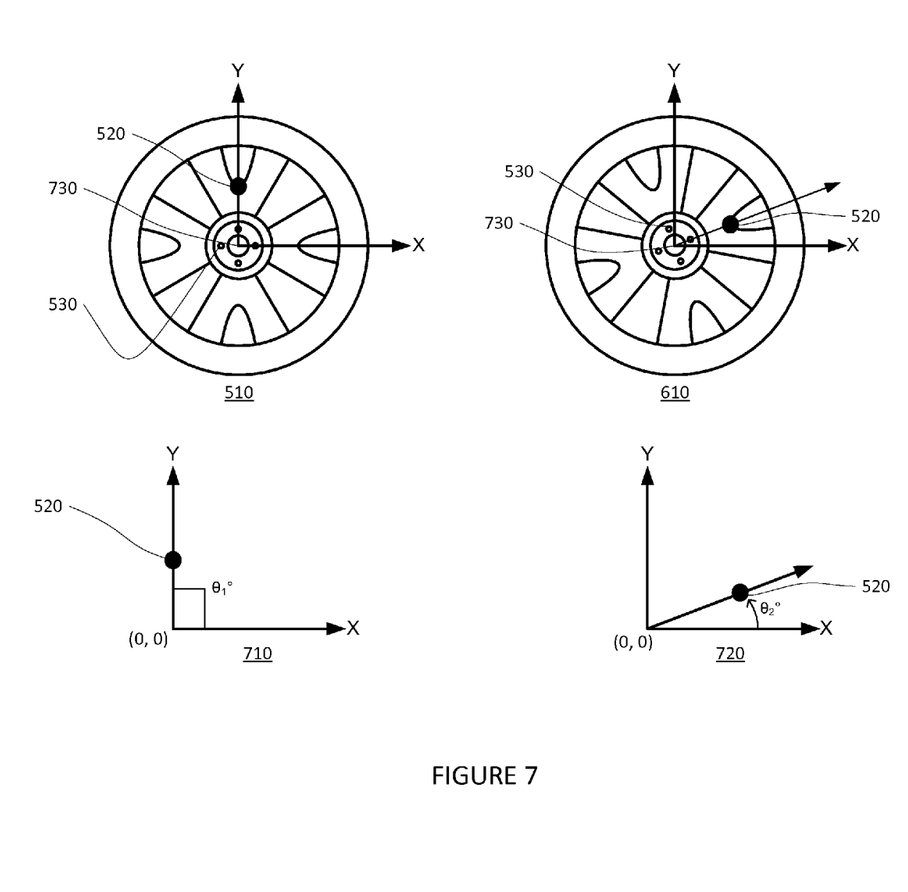
FIG. 7 is an example illustration of comparing wheel orientation in accordance with aspects of the disclosure.

If the image data corresponding to the wheels includes a tracking feature, the computing device may track the location of each tracking feature over time. For example, as shown in FIG. 7, the locations of the tracking feature 520 may be tracked between image data associated with wheels 510 and 610. The position of the tracking feature 520 may then be measured relative to another point on the vehicle, such as the wheel's center 730. In this regard, the wheel's center 730 may be mapped to an origin (0,0) of a 2D coordinate system. For example, the wheel's center 730 may be mapped to the origins, (0,0), in 2D coordinate systems 710 and 720, respectively. Relative to the x-axis of coordinate system 710, tracking feature 520 is at angle $\theta_1°$ in the image data corresponding to wheel 510. Relative to the x-axis of coordinate system 720, tracking feature 520 is at an angle $\theta_2°$ in the image data corresponding to wheel 610. Though not shown in FIG. 7, the position of other tracking features, such as tracking features 530, may be measured relative to the another portion of the vehicle as well.

The computing device may determine that the vehicle is in motion based on the angular distance that a tracking feature moved relative to the reference point from one image to the next, over a period of time. In this regard, when the angular distance surpasses a threshold value in a period of time, the computing device may determine that the vehicle associated with the tracking feature is in motion. For example, as shown in FIG. 7, tracking feature 520 is at an angle of $\theta_1°$ when the first image data 410 is captured, and at an angle of $\theta_2°$ when the second image data 420 is captured. As previously described, the time between the capture of first image data 410 and second image data 420 may be a sixtieth of a second. The computing device may then determine the difference between $\theta_1°$ and $\theta_2°$ is 60 degrees. Upon determining the angular rotation of the tracking feature 520 surpasses a predetermined threshold, such as five degrees, or more or less, and that the tracking feature 520 surpassed the threshold in a predetermined time period, such as one second, or more or less, a determination that the surrounding vehicle 310 is in motion may be made. In some embodiments a certain number of tracking features, such as 10 or more or less, may need to surpass the predetermined threshold prior to a determination that the surrounding vehicle is in motion.

The computing device, upon determining that a surrounding vehicle is in motion, may generate a signal. For instance, the signal may be a notification that causes the first vehicle to automatically perform a driving function, such as steering away from the surrounding vehicle, braking, and/or accelerating. In some embodiments a visual or audio notification may be provided within the cabin of the first vehicle notifying the passengers and driver of the first vehicle that a surrounding vehicle is in motion. In another embodiment, the signal may include information about the speed and direction of motion of the surrounding vehicle. In other embodiments the signal may be transmitted to other computing devices and/or memory.

The features described herein may allow for the automatic detection of a slow moving vehicle in the vicinity of the first vehicle. This may allow the first vehicle to move more safely through complex driving environments, such as residential neighborhoods. In addition, the system may provide performance advantages over other techniques that are more susceptible to signal noise. The system may also provide performance advantages over other techniques which have difficulty determining if slow moving objects are in motion. In other embodiments the system may be used to track objects other than automobiles, such as bikes and pedestrians by tracking one or more of their features. For example, the system may track the arm or leg of a jogger to determine if the jogger is in motion.

Figure 8:
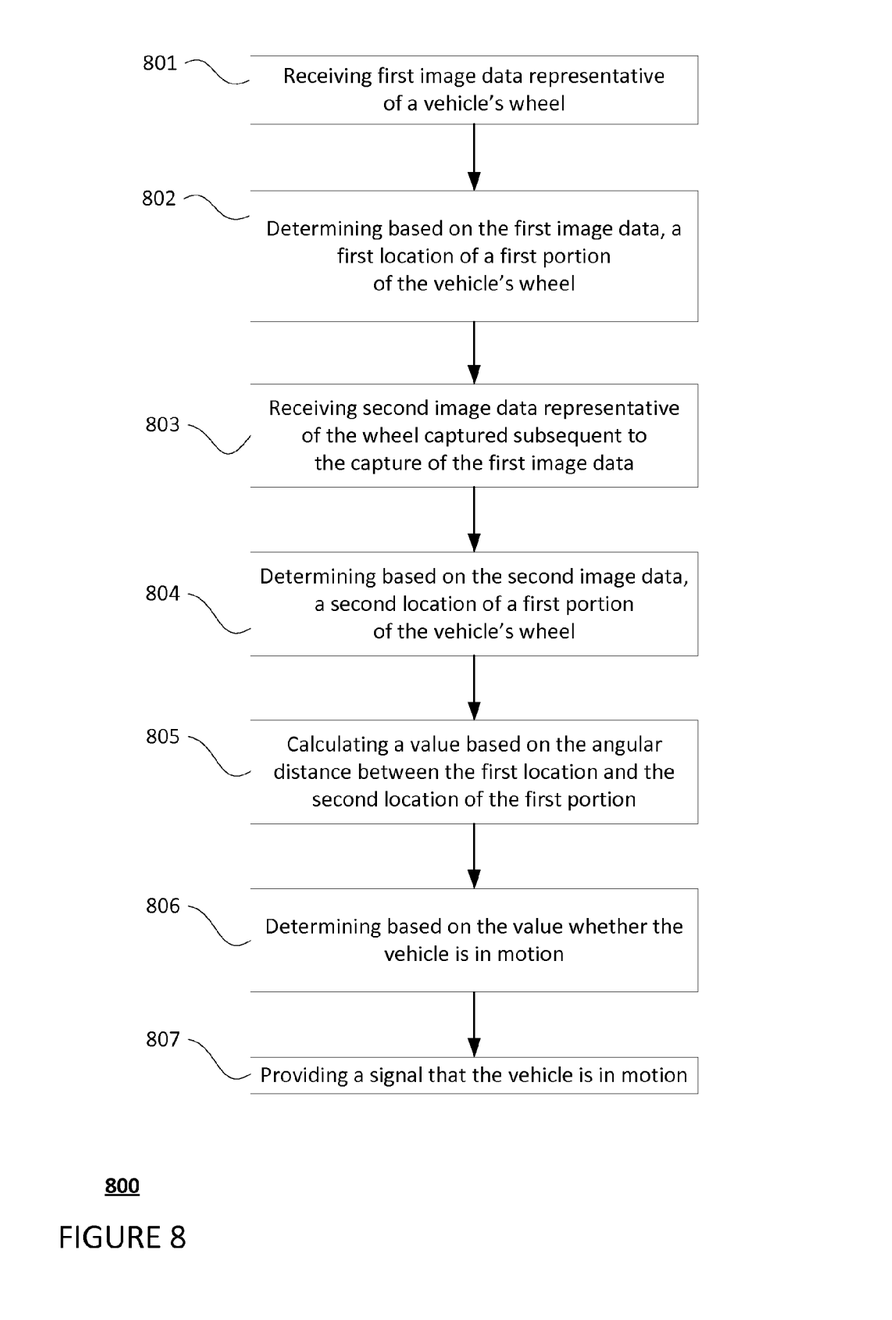
FIG. 8 is a flow diagram in accordance with aspects of the disclosure.

Flow diagram 800 of FIG. 8 is an example of some of the aspects described above which may be performed by the driving computing system 110. In this example, first image data representative of a vehicle's wheel may be received, as shown at block 801. Based on the first image data, a first location of a first portion of the vehicle's wheel may be determined, as shown at block 802. Second image data representative of a vehicle's wheel captured subsequent to the capture of the first image data may be received, as shown at block 803. Based on the second image data, a second location of a first portion of the vehicle's wheel may be determined, as shown at block 804. As shown at blocks 805 and 806, a value based on the angular distance between the first location and the second location may be calculated, and a determination whether the vehicle is in motion may be made based on the value. A signal may be provided indicating that the vehicle is in motion, as shown in block 807.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer implemented method for detecting vehicle movement, the method comprising:
   receiving, with one or more computing devices, first image data representative of a first vehicle's wheel;
   determining, with the one or more computing devices and based on the first image data, a first location of a first portion of the wheel;
   receiving, with the one or more computing devices, second image data representative of the wheel captured subsequent to the capture of the first image data;
   determining, with the one or more computing devices and based on the second image data, a second location of the first portion of the wheel;
   generating, with the one or more computing devices, an initial determination whether the first vehicle is in motion;
   assigning, with the one or more computing devices, a confidence level to the initial determination;
   determining the confidence level satisfies a threshold value; and
   upon determining the confidence level satisfies the threshold value:
      calculating, with the one or more computing devices, a value based on an angular distance between the first location and the second location of the first portion;
      determining, with the one or more computing devices and based on the value, whether the first vehicle is in motion; and
      providing a signal that the first vehicle is in motion.

2. The method of claim 1, wherein receiving first image data representative of the wheel further comprises:
   receiving, from a sensor located on a second vehicle, a series of images of an environment surrounding the second vehicle;
   analyzing the series of images to identify a first image having image data that includes visual characteristics of the first vehicle and the wheel of the first vehicle; and
   selecting, as the first image data, the image data associated with said visual characteristics of the wheel.

3. The method of claim 1, wherein receiving second image data representative of the wheel further comprises:
   receiving, from a sensor located on a second vehicle, a series of images of an environment surrounding the second vehicle;
   analyzing the series of images to identify a second image having image data that includes visual characteristics of the first vehicle and the wheel of the first vehicle; and
   selecting, as the second image data, the image data associated with said visual characteristics of the wheel.

4. The method of claim 3, wherein the second image data is updated to image data from an image captured subsequently to the second image upon a determination that the first vehicle is not in motion.

5. The method of claim 1, wherein determining a first location of a first portion of the wheel further comprises:
   determining a trackable feature within the first image data representative of the wheel;
   determining a location of the trackable feature relative to the center of the wheel; and
   selecting the location of the trackable feature as the first location of the first portion of the wheel.

6. The method of claim 1, wherein determining a second location of a first portion of the wheel further comprises:
   determining a trackable feature within the second image data representative of the wheel;
   determining a location of the trackable feature relative to the center of the wheel; and
   selecting the location of the trackable feature as the second location of the first portion of the wheel.

7. The method of claim 1, wherein determining whether the first vehicle is in motion further comprises:
   comparing the value to a first threshold value; and
   determining the first vehicle is in motion if the value is greater than the first threshold value.

8. The method of claim 1, wherein generating the initial determination whether the first vehicle is in motion comprises:
   determining, with the one or more computing devices and based on the first image data, a first linear distance between the first vehicle and an external object;
   determining, with the one or more computing devices and based on the second image data, a second linear distance between the first vehicle and the external object;
   calculating, with the one or more computing devices, a difference value between the first linear distance and the second linear distance; and
   based on the difference value, generating the initial determination whether the first vehicle is in motion.

9. The method of claim 1, wherein determining the confidence level satisfies a threshold value includes determining the confidence level is less than the threshold value.

10. A system for detecting vehicle movement comprising:
    one or more sensors;
    one or more computing devices; and
    memory storing instructions, the instructions executable by the one or more computing devices;
    wherein the instructions comprise:
       determining, based on first image data representative of a first vehicle's wheel received from the one or more sensors, a first location of a first portion of the wheel;
       determining, based on second image data representative of the wheel captured subsequent to the capture of the first image data received from the one or more sensors, a second location of the first portion of the wheel;
       generating an initial determination whether the first vehicle is in motion;
       assigning a confidence level to the initial determination;
       determining the confidence level satisfies a threshold value; and
       upon determining the confidence level satisfies the threshold value:
          calculating a value based on an angular distance between the first location and the second location of the first portion;

determining, based on the value, whether the first vehicle is in motion; and providing a signal that the first vehicle is in motion.

11. The system of claim 10, wherein receiving first image data representative of the wheel further comprises:
receiving, from the one or more sensors, a series of images of an environment surrounding a second vehicle;
analyzing the series of images to identify a first image having image data that includes visual characteristics of the first vehicle and the wheel of the first vehicle; and
selecting, as the first image data, the image data associated with said visual characteristics of the wheel.

12. The system of claim 10, wherein receiving second image data representative of the wheel further comprises:
receiving, from the one or more sensors, a series of images of an environment surrounding a second vehicle;
analyzing the series of images to identify a second image having image data that includes visual characteristics of the first vehicle and the wheel of the first vehicle; and
selecting, as the second image data, the image data associated with said visual characteristics of the wheel.

13. The system of claim 12, wherein the second image data is updated to image data from an image captured subsequently to the second image upon a determination that the first vehicle is not in motion.

14. The system of claim 10, wherein determining a first location of a first portion of the wheel further comprises:
determining a trackable feature within the first image data representative of the wheel;
determining a location of the trackable feature relative to the center of the wheel; and
selecting the location of the trackable feature as the first location of the first portion of the wheel.

15. The system of claim 10, wherein determining a second location of a first portion of the wheel further comprises:
determining a trackable feature within the second image data representative of the wheel;
determining a location of the trackable feature relative to the center of the wheel; and
selecting the location of the trackable feature as the second location of the first portion of the wheel.

16. The system of claim 10, wherein determining whether the first vehicle is in motion further comprises:
comparing the value to a first threshold value; and
determining the first vehicle is in motion if the value is greater than the first threshold value.

17. The system of claim 10, wherein generating the initial determination whether the first vehicle is in motion comprises:
determining, based on the first image data, a first linear distance between the first vehicle and an external object;
determining, based on the second image data, a second linear distance between the first vehicle and the external object;
calculating a difference value between the first linear distance and the second linear distance; and
based on the difference value, generating the initial determination whether the first vehicle is in motion.

18. The system of claim 10, wherein determining the confidence level satisfies a threshold value includes determining the confidence level is less than the threshold value.

19. A non-transitory computer-readable storage medium on which computer-readable instructions of a program are stored, the instructions, when executed by a processor, cause the processor to perform a method, the method comprising:
receiving, from one or more computing devices, first image data representative of a first vehicle's wheel;
determining, based on the first image data, a first location of a first portion of the wheel;
receiving, from the one or more computing devices, second image data representative of the wheel captured subsequent to the capture of the first image data;
determining, based on the second image data, a second location of the first portion of the wheel;
generating an initial determination whether the first vehicle is in motion;
assigning a confidence level to the initial determination;
determining the confidence level satisfies a threshold value; and
upon determining the confidence level satisfies the threshold value:
calculating a value based on an angular distance between the first location and the second location of the first portion;
determining, based on the value, whether the first vehicle is in motion; and
providing a signal that the first vehicle is in motion.

20. The non-transitory computer-readable storage medium of claim 19, wherein receiving first image data representative of the wheel further comprises:
receiving, from a sensor located on a second vehicle, a series of images of an environment surrounding the second vehicle;
analyzing the series of images to identify a first image having image data that includes visual characteristics of the first vehicle and the wheel of the first vehicle; and
selecting, as the first image data, the image data associated with said visual characteristics of the wheel.

* * * * *